(12) United States Patent
Ciofolo et al.

(10) Patent No.: US 8,509,506 B2
(45) Date of Patent: Aug. 13, 2013

(54) AUTOMATIC 3-D SEGMENTATION OF THE SHORT-AXIS LATE-ENHANCEMENT CARDIAC MRI

(75) Inventors: Cybele Ciofolo, Meudon (FR); Maxim Fradkin, Puteaux (FR); Benoit Mory, Paris (FR)

(73) Assignee: Koninklijke Philips N.V., Eindhoven (NL)

( * ) Notice: Subject to any disclaimer, the term of this patent is extended or adjusted under 35 U.S.C. 154(b) by 571 days.

(21) Appl. No.: 12/864,515

(22) PCT Filed: Jan. 26, 2009

(86) PCT No.: PCT/IB2009/050301
§ 371 (c)(1),
(2), (4) Date: Jul. 26, 2010

(87) PCT Pub. No.: WO2009/095837
PCT Pub. Date: Aug. 6, 2009

(65) Prior Publication Data
US 2010/0303328 A1  Dec. 2, 2010

(30) Foreign Application Priority Data

Jan. 31, 2008 (EP) .................................... 08305012

(51) Int. Cl.
*G06K 9/00* (2006.01)
(52) U.S. Cl.
USPC ......................................................... 382/128
(58) Field of Classification Search
USPC ........ 382/117, 128–131; 600/7–11, 411–435
See application file for complete search history.

(56) References Cited

U.S. PATENT DOCUMENTS 3,069,654 A   12/1962  Hough
5,633,951 A    5/1997  Moshgeghi
(Continued)

FOREIGN PATENT DOCUMENTS
WO    2006033066 A1   3/2006

OTHER PUBLICATIONS

WO 2006/033066; Koninkl Philips Electronics NV [NL]; Image Processing Apparatus for Use in Cardiac; Breeuwer Marcel; Mar. 30, 2006.*

(Continued)

*Primary Examiner* — Gerald J. O'Connor
*Assistant Examiner* — Edward Winston, III

(57) ABSTRACT

The invention relates to a system (200) for delineating an anatomical structure in an image computed from a slice of image data, the system (200) comprising a partition unit (210) for partitioning the image into a plurality of image portions, each image portion depicting a portion of the anatomical structure, and an adaptation unit (220) for adapting a template to the image based on a criterion function, the criterion function being a function of template parameters and of image values and their relative positions in the image, and on a criterion to be satisfied by a computed value of the criterion function, wherein the criterion function is defined on the basis of the plurality of image portions. Having a criterion function defined on the basis of the plurality of image portions allows computing optimal contributions to the criterion function value within each portion of the image. This is proven to be particularly useful for extracting myocardial contours in a slice of the LEMR short-axis volume image data in the presence of scar tissues. The invention allows optimizing the treatment of portions of the image comprising scar tissue in the myocardium.

11 Claims, 8 Drawing Sheets

(56) References Cited

U.S. PATENT DOCUMENTS

| | | | |
|---|---|---|---|
| 6,961,454 | B2 | 11/2005 | Jolly |
| 7,079,674 | B2 | 7/2006 | Paragios et al. |
| 2006/0241376 | A1 | 10/2006 | Noble et al. |
| 2007/0116339 | A1 | 5/2007 | Shen |
| 2008/0317307 | A1* | 12/2008 | Lu et al. .................. 382/128 |
| 2012/0300904 | A1* | 11/2012 | Shimada et al. ............ 378/62 |

OTHER PUBLICATIONS

Brigger et al "B-Spline Snakes: A Flexible Tool for Parametric Contour Detection"; IEEE Transactions on Image Processing, vol. 9, No. 9, Sep. 2000, pp. 1484-1496.

Hautvast et al: "Automatic Contour Propagation in Cine Cardiac Magnetic Images"; IEEE Transactions on Medical Imaging, vol. 25, No. 11, Nov. 2006, pp. 1472-1482.

Unser et al: "B-Spline Signal Processing: Part Theory"; IEEE Transactions on Signal Processing, vol. 41, No. 2, Feb. 1993, pp. 821-833.

Dikici et al: "Quantification of Delayed Enhancement MR Images"; Proceedings of the 7th International Conference on Medical Image Computing and Computer-Assisted Intervention (MICCAI'04), LNCS Series, vol. 3216, 2004, pp. 250-257.

Pluempitiwiriyawej et al: "Active Contours With Automatic Initialization for Myocardial Perfusion Analysis"; Proceedings of the 2005 IEEE Engineering in Medicine and Biology 27th Conference, 2005, pp. 3332-3335.

Ciofolo et al: "Automatic Myocardium Segmentation in Late-Enhancement MRI"; IEEE 5th Internatonial Symposium on Biomedical Imaging: From Nano to Macro, May 2008, pp. 225-228.

Ciofolo et al: "Segmentation of Pathological Hearts in Long-Axis Late-Enhancement MRI"; Medical Image Computing and Computer-Assisted Intervention (MICCAI 2008, Part 1, LNCS, Vol. 5241, pp. 186-193.

Termeer et al: "CoViCAD: Comprehensive Visualization of Coronary Artery Disease"; IEEE Transaction on Visualization and Computer Graphics, vol. 13, No. 6, Nov./Dec. 2007, pp. 1632-1639.

Orderud et al: "Automatic Alignment of Standard Views in 3D Echocardiograms Using Real-Time Tracking";Medical Imaging 2009, Ultrasonic Imaging and Signal Processing, Edited by Stephen A. McAleavey, Proceedings of the SPIE, vol. 7265, 2009, pp. 72650D-72650D-7.

Jolly, M.: "Combining Edge, Region, and Shape Information to Segment the Left Ventricle in Cardiac MR Images"; Mideical Image Computing and Computer-Assisted Intervention (MICCAI 2001), LNCS 2, vol. 2208, pp. 482-490.

Lynch et al: "Automatic Segmentation of the Left Ventricle Cavity and Myocardium in MRI Data"; Computers in Biology and Medicine, vol. 36, 2006, pp. 389-407.

Bracewell, R.: "The Fourier Transform and Its Applications", McGraw-Hill Publishers, 1999, pp. 244-250.

Rousseeuw et al: "Robust Regression and Outlier Detection"; John Wiley & Sons, Chapter 5.

* cited by examiner

AUTOMATIC 3-D SEGMENTATION OF THE SHORT-AXIS LATE-ENHANCEMENT CARDIAC MRI

FIELD OF THE INVENTION

The invention relates to image segmentation and more particularly to delineating an anatomical structure in an image computed from a slice of image data and further to delineating the anatomical structure in the image data.

BACKGROUND OF THE INVENTION

Heart-muscle-tissue-viability assessment is essential for surgery and therapy planning following a heart attack. In particular, the proportion of viable myocardium is a major factor in determining whether a patient may benefit from a revascularization procedure. In addition to estimating the left ventricle thickness and thickening, it is possible to visualize normal, ischemic and non-viable areas with high spatial resolution, using contrast-enhanced imaging techniques and particularly late-enhancement magnetic resonance (LEMR). To locate and quantify non-viable tissues, the first step consists in delineating the endo- and epicardial contours (in other words, segmenting the myocardium) in every slice (typically in 10 to 12 slices) of the LEMR short-axis volume data, which is tedious and time-consuming when carried out manually. However, automatic myocardium segmentation is challenging and seldom implemented in current commercial products. Designing an automatic method to delineate the endo- and epicardial contours is difficult, mainly because of the non-homogeneity of the myocardium tissue resulting from contrast agent accumulation in ischemic and non-viable areas.

FIG. 1 shows an image computed from a slice of LEMR SA image data. The first picture 11 shows the image without myocardial contours. The second picture 12 shows the image with myocardial contours manually drawn by experts. The border between the blood pool 110 and the abnormal tissues 120 inside the myocardium is difficult to locate. The scar region 120 appears in white, while the healthy part 130 is dark and the surrounding organs vary from gray to dark. Moreover, the borders of the white regions often appear very fuzzy, especially if they are close to the blood pool, which makes correctly locating the endocardium particularly difficult. Thus, the challenge is to extract a structure like the myocardium, which may contain both dark and white areas, from a textured environment.

An automatic segmentation algorithm for segmenting LEMR SA images is described in an article by E. Dikici, T. O'Donnell, R. Setser and R. D. White, "Quantification of delayed enhancement MR images", *Proc. of the 7th International Conference on Medical Image Computing and Computer-Assisted Intervention (MICCAI '04)*, LNCS Series, Vol. 3216, Springer, pp. 250-257, 2004.

SUMMARY OF THE INVENTION

It would be advantageous to provide an alternative solution for delineating myocardial contours in a slice of the LEMR short-axis volume image data in the presence of scar tissues, which would also be useful for delineating other structures in images acquired using various image acquisition modalities.

Thus, in an aspect, the invention provides a system for delineating an anatomical structure in an image computed from a slice of image data, the system comprising:

a partition unit for partitioning the image into a plurality of image portions, each image portion depicting a portion of the anatomical structure; and an adaptation unit for adapting a template to the image, based on a criterion function, the criterion function being a function of template parameters and of image values and their relative positions in the image, and on a criterion to be satisfied by a computed value of the criterion function, wherein the criterion function is defined on the basis of the plurality of image portions.

In other words, the criterion function depends on the partitioning of the image into a plurality of portions. For example, the criterion function may comprise a term dependent on the mean gray value or on the variance of gray values of pixels comprised in a portion of the image. Having a criterion function defined on the basis of the plurality of image portions allows computing optimal contributions to the criterion function value within each portion of the image. For example, in an embodiment the contributions may be based on the type of myocardial tissue detected in a region of the portion. The criterion function may comprise terms dependent on the type of detected tissue. If a first type of tissue is detected, terms corresponding to the first type of tissue are arranged to contribute to the value of the criterion function. If a second type of tissue is detected, terms corresponding to the second type of tissue are arranged to contribute to the value of the criterion function. This is proven to be particularly useful for extracting myocardial contours in a slice of the LEMR short-axis volume image data in the presence of scar tissues. The invention allows optimizing the treatment of portions of the image comprising scar tissue in the myocardium. The invention may be also applied to segment other normal or pathological anatomical structures acquired with various image acquisition modalities.

In an embodiment of the system, the adaptation unit is further arranged for detecting an abnormal tissue of the anatomical structure in an image portion of the plurality of image portions and the criterion function comprises a term contributing to the criterion function when said abnormal tissue is detected in said image portion. An abnormal tissue of the anatomical structure may be detected based on the mean intensity or on the variance of values of pixels of a portion of the image overlapping with the template, for example. The criterion function may comprise a term corresponding to abnormal tissue located in a portion of the image. Such a term may be arranged to contribute to the value of the criterion function when abnormal tissue is detected in the portion of the partition of the image.

In an embodiment of the system, adapting the template is based on searching for values of the template parameters, for which the criterion function satisfies the criterion condition, using a greedy search algorithm. This choice provides a good compromise between complexity of the computation and sensitivity to initial conditions. For example, greedy search algorithms are more robust than gradient-descent algorithms and less complex than dynamic programming algorithms. Advantageously, using a greedy search algorithm allows using a non-differentiable criterion function.

In an embodiment of the system, the template is a closed ribbon defined by an external and an internal closed contour. The closed ribbon template is useful for modeling epicardial and endocardial contours of the myocardium.

In an embodiment of the system, the partition is a pie-like partition. The pie-like partition centered at the center of the left ventricle is suitable for delineating the myocardium and other anatomical structures which may be described by closed contours.

In an embodiment, the system further comprises a registration unit for registering a surface model with a plurality of templates, wherein each template is adapted to an image computed from a slice of image data and wherein at least one template is adapted by the adaptation unit 220 of the system 200. The system is further arranged for delineating the anatomical structure in the image data, using the advantage of the fact that at least one template is optimally adapted by the adaptation unit of the system.

In an embodiment of the system, the registration unit comprises:

an affine transformation unit for affinely registering the surface model with the plurality of templates, thereby creating an affinely registered surface model;

a local deformation unit for locally non-affinely registering the affinely registered surface model with the plurality of templates, thereby creating a locally registered surface model; and a refinement unit for adapting the locally registered surface model to the image data.

Using affine registration followed by non-affine registration improves the robustness of the method employed by the registration unit. Optionally, affine transformations may be limited to rigid transformations. The refinement of the surface model is important to do the final adjustment of the surface model near abnormal tissues.

In a further aspect, the invention provides a method of delineating an anatomical structure in an image computed from a slice of image data, the method comprising:

a partition step for partitioning the image into a plurality of image portions, each image portion depicting a portion of the anatomical structure; and an adaptation step for adapting a template to the image, based on a criterion function, the criterion function being a function of template parameters and of image values and their relative positions in the image, and on a criterion to be satisfied by a computed value of the criterion function, wherein the criterion function is defined on the basis of the plurality of image portions.

In a further aspect, the invention provides a computer program product to be loaded by a computer arrangement, the computer program product comprising instructions for delineating an anatomical structure in an image computed from a slice of image data, the computer arrangement comprising a processing unit and a memory, the computer program product, after being loaded, providing said processing unit with the capability to carry out the tasks of:

partitioning the image into a plurality of image portions, each image portion depicting a portion of the anatomical structure; and adapting a template to the image, based on a criterion function, the criterion function being a function of template parameters and of image values and their relative positions in the image, and on a criterion to be satisfied by a computed value of the criterion function, wherein the criterion function is defined on the basis of the plurality of image portions.

In a further aspect of the invention, the system according to the invention is comprised in an image acquisition apparatus.

In a further aspect of the invention, the system according to the invention is comprised in a workstation.

It will be appreciated by those skilled in the art that two or more of the above-mentioned embodiments, implementations, and/or aspects of the invention may be combined in any way deemed useful.

Modifications and variations of the image acquisition apparatus, of the workstation, of the method, and/or of the computer program product, which correspond to the described modifications and variations of the system, can be carried out by a person skilled in the art on the basis of the present description.

A person skilled in the art will appreciate that the method may be applied to multidimensional image data, e.g., to 2-dimensional (2-D) 3-dimensional (3-D) or 4-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will become apparent from and will be elucidated with respect to the implementations and embodiments described hereinafter and with reference to the accompanying drawings, wherein.

Identical reference numerals are used to denote similar parts throughout the Figures.

DETAILED DESCRIPTION OF EMBODIMENTS

Figure 1:
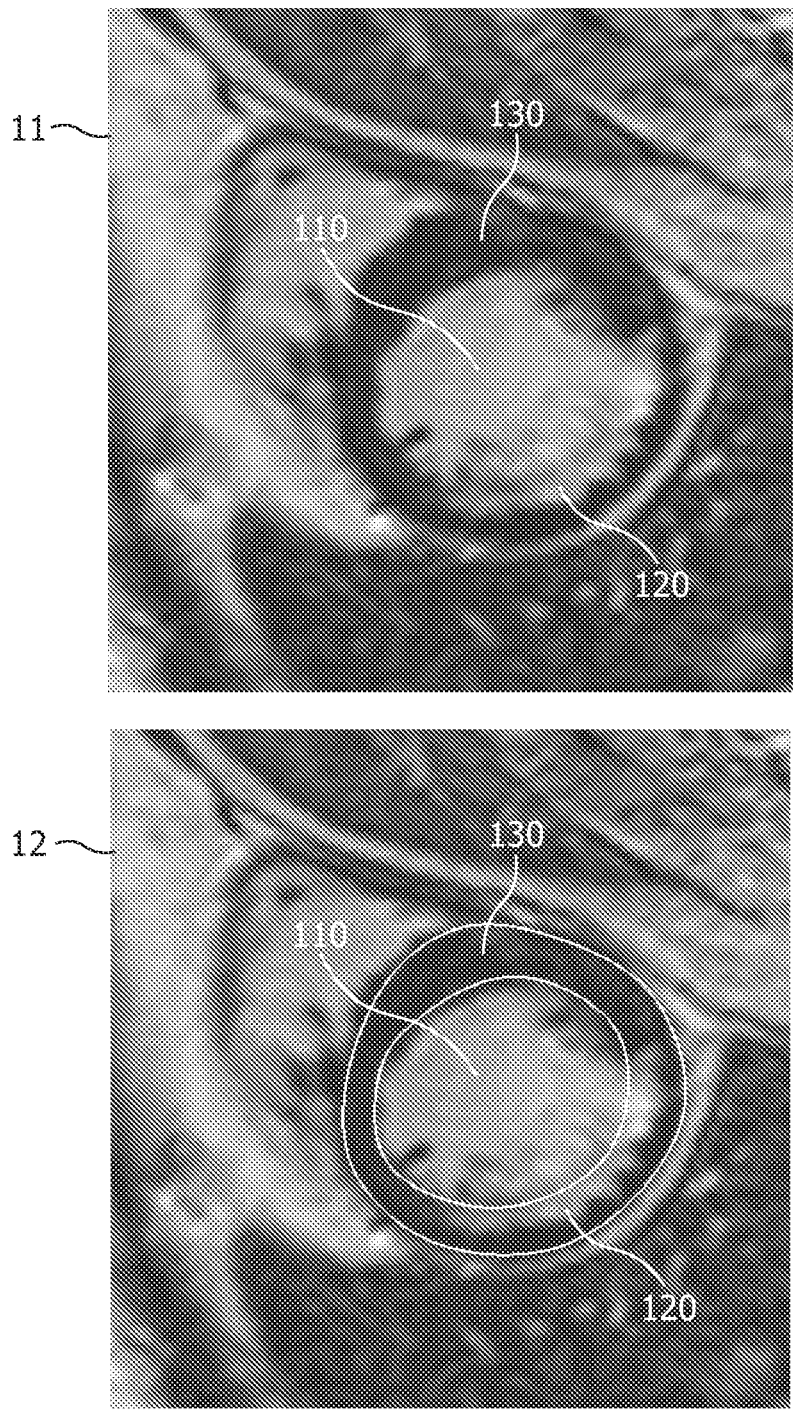
FIG. 1 shows an image computed from a slice of LEMR SA image data without and with myocardial contours manually drawn by experts.
Figure 2:
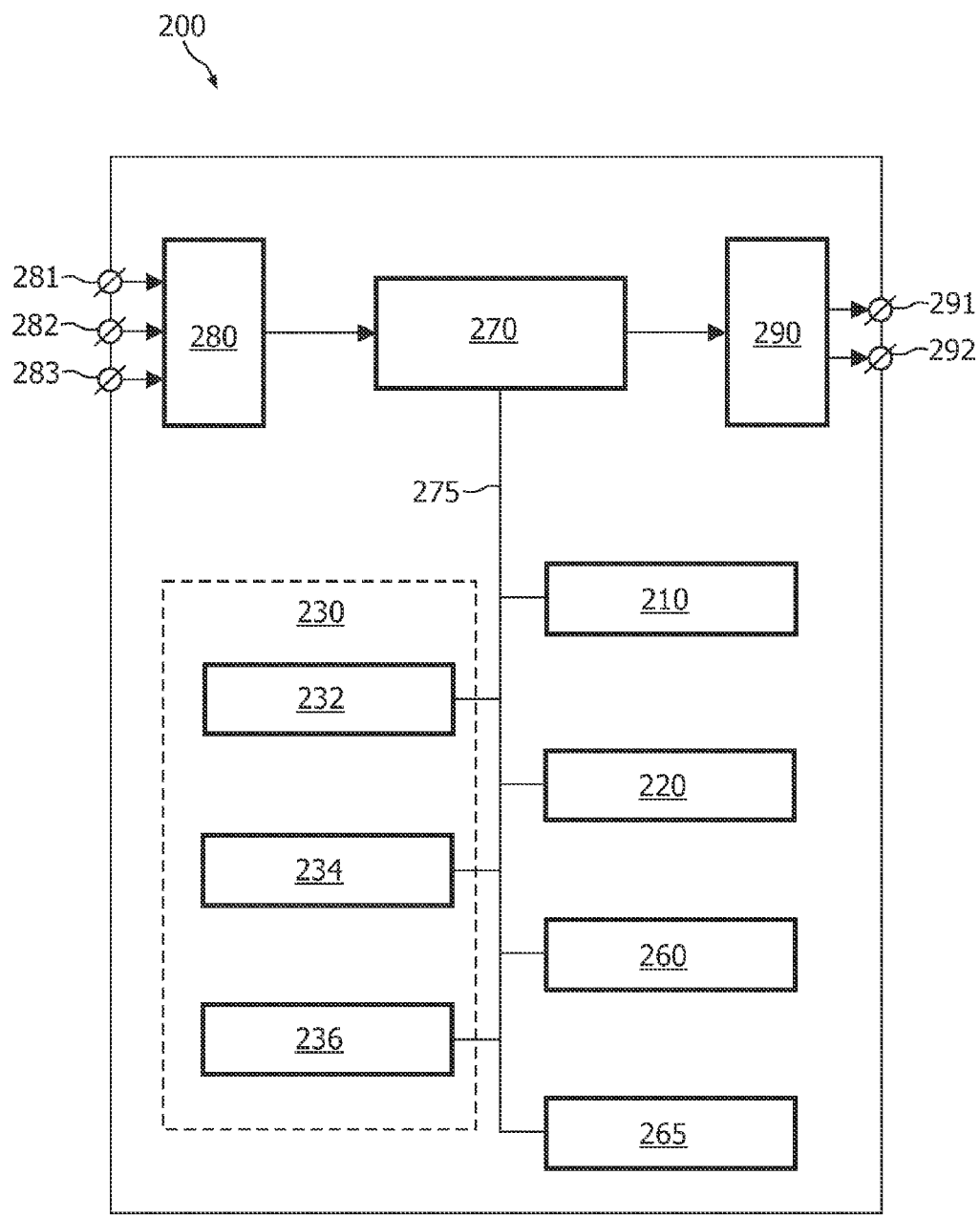
FIG. 2 schematically shows a block diagram of an exemplary embodiment of the system.

FIG. 2 schematically shows a block diagram of an exemplary embodiment of the system 200 for delineating an anatomical structure in an image computed from a slice of image data, the system 200 comprising:

a partition unit 210 for partitioning the image into a plurality of image portions, each image portion depicting a portion of the anatomical structure; and an adaptation unit 220 for adapting a template to the image, based on a criterion function, the criterion function being a function of template parameters and of image values and their relative positions in the image, and on a criterion to be satisfied by a computed value of the criterion function, wherein the criterion function is defined on the basis of the plurality of image portions.

The exemplary embodiment of the system 200 further comprises the following units:

a registration unit 230 for registering a surface model with a plurality of templates, wherein each template is adapted to an image computed from a slice of image data and wherein at least one template is adapted by the adaptation unit 220 of the system 200;

a control unit 260 for controlling the workflow in the system 200;

a user interface 265 for communicating with a user of the system 200; and a memory unit 270 for storing data.

In an embodiment of the system 200, the registration unit 230 comprises:

an affine transformation unit 232 for affinely registering the surface model with the plurality of templates, thereby creating an affinely registered surface model;

a local deformation unit 234 for locally non-affinely registering the affinely registered surface model with the plurality of templates, thereby creating a locally registered surface model; and a refinement unit 236 for adapting the locally registered surface model to the image data.

In an embodiment of the system 200, there are three input connectors 281, 282 and 283 for the incoming data. The first input connector 281 is arranged to receive data coming in from a data storage means such as, but not limited to, a hard disk, a magnetic tape, a flash memory, or an optical disk. The second input connector 282 is arranged to receive data coming in from a user input device such as, but not limited to, a mouse or a touch screen. The third input connector 283 is arranged to receive data coming in from a user input device such as a keyboard. The input connectors 281, 282 and 283 are connected to an input control unit 280.

In an embodiment of the system 200, there are two output connectors 291 and 292 for the outgoing data. The first output connector 291 is arranged to output the data to a data storage means such as a hard disk, a magnetic tape, a flash memory, or an optical disk. The second output connector 292 is arranged to output the data to a display device. The output connectors 291 and 292 receive the respective data via an output control unit 290.

A person skilled in the art will understand that there are many ways to connect input devices to the input connectors 281, 282 and 283 and the output devices to the output connectors 291 and 292 of the system 200. These ways comprise, but are not limited to, a wired and a wireless connection, a digital network such as, but not limited to, a Local Area Network (LAN) and a Wide Area Network (WAN), the Internet, a digital telephone network, and an analog telephone network.

In an embodiment of the system 200, the system 200 comprises a memory unit 270. The system 200 is arranged to receive input data from external devices via any of the input connectors 281, 282, and 283 and to store the received input data in the memory unit 270. Loading the input data into the memory unit 270 allows quick access to relevant data portions by the units of the system 200. The input data may comprise, for example, the image data and the template. Optionally, the input data may further comprise the surface model. The memory unit 270 may be implemented by devices such as, but not limited to, a Random Access Memory (RAM) chip, a Read Only Memory (ROM) chip, and/or a hard disk drive and a hard disk. The memory unit 270 may be further arranged to store the output data. The output data may comprise, for example, the template adapted to the slice of the image data according to the invention. Optionally, the output data may further comprise the registered surface model. The memory unit 270 may be also arranged to receive data from and/or deliver data to the units of the system 200 comprising the partition unit 210, the adaptation unit 220, the registration unit 230, the affine transformation unit 232, the local deformation unit 234, the refinement unit 236, the control unit 260, and the user interface 265, via a memory bus 275. The memory unit 270 is further arranged to make the output data available to external devices via any of the output connectors 291 and 292. Storing data from the units of the system 200 in the memory unit 270 may advantageously improve the performance of the units of the system 200 as well as the rate of transfer of the output data from the units of the system 200 to external devices.

Alternatively, the system 200 may comprise no memory unit 270 and no memory bus 275. The input data used by the system 200 may be supplied by at least one external device, such as an external memory or a processor, connected to the units of the system 200. Similarly, the output data produced by the system 200 may be supplied to at least one external device, such as an external memory or a processor, connected to the units of the system 200. The units of the system 200 may be arranged to receive the data from each other via internal connections or via a data bus.

In an embodiment of the system 200, the system 200 comprises a control unit 260 for controlling the workflow in the system 200. The control unit may be arranged to receive control data from and provide control data to the units of the system 200. For example, after adapting the template to the image computed from a first slice of the image data, the adaptation unit 220 may be arranged to provide control data "the template is adapted to the image" to the control unit 260 and the control unit 260 may be arranged to provide control data "adapt the template to the image computed from a second slice of image data" to the adaptation unit 220. Computing the image from the first and second slice may be carried out by the adaptation unit 220. Alternatively, a control function may be implemented in another unit of the system 200, e.g., in the adaptation unit 220.

In an embodiment of the system 200, the system 200 comprises a user interface 265 for communicating with the user of the system 200. The user interface 265 may be arranged to receive a user input for selecting the template for adapting to the image, from a set of templates available in the system 200, or a user input for partitioning the image. The user interface may further provide means for presenting a view of the adapted template to the user. Optionally, the user interface may receive a user input for selecting a mode of operation of the system such as, e.g., for selecting several terms of the criterion function. A person skilled in the art will understand that more functions may be advantageously implemented in the user interface 265 of the system 200.

The embodiments of the invention will be now described with reference to delineating epicardial and endocardial contours and surfaces in LEMR SA image data. A person skilled in the art will appreciate that the system is also useful for segmentation of other structures, including, but not limited to liver, pancreas and blood vessels, in CT or MR scans.

Figure 3:
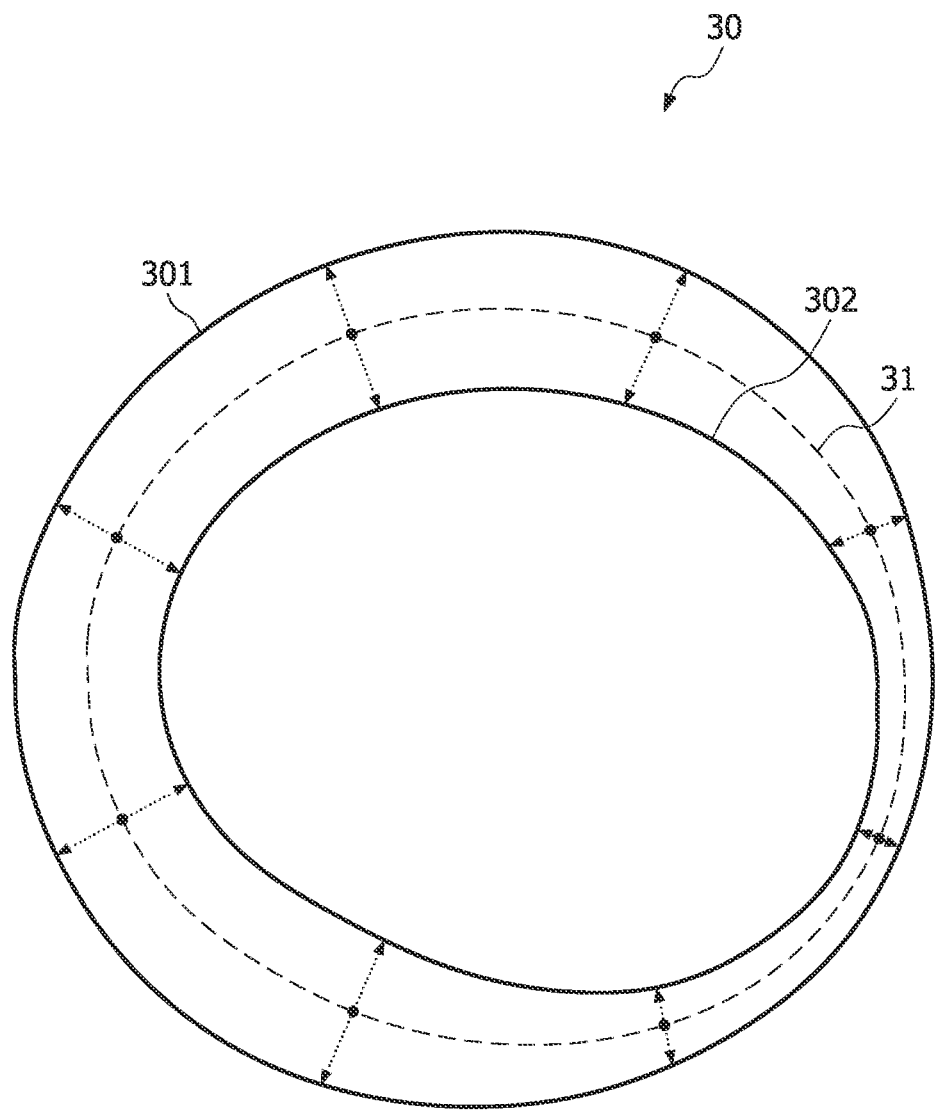
FIG. 3 illustrates a closed ribbon template.

In an embodiment of the invention, the template suitable for modeling a myocardium is a closed ribbon as illustrated in FIG. 3. The template is implemented with interpolating splines using as few nodes as possible to reduce the number of model parameters. In an embodiment, the spline parameters are defined using 8 nodes. Using more nodes to define template parameters increases the precision of the computations at the cost of computational time. Using splines yields optimally smooth solutions. Furthermore, the specific choice of interpolating basis functions and node points, as opposed to approximating functions and control points, increases the algorithm stability and the consistency of the optimization strategy. Using splines for delineating contours in images is described in a paper by P. Brigger, J. Hoeg and M. Unser, "B-Spline Snakes: A Flexible Tool for Parametric Contour Detection", *IEEE Transactions on Image Processing*, Vol. 9, No. 9, pp. 1484-1496, 2000. More specifically, the myocardium is modeled as a ribbon structure 30, composed of a virtual centerline 31 comprising a plurality of nodes (schematically illustrated by the dots) and described by width parameters (schematically illustrated by the arrows). Both the centerline and the width are continuous spline interpolations of a discrete set of parameters $(x_i, y_i, w_i)$, where $x_i, y_i$ denote the centerline's i-th node coordinates in an image coordinate system, and $w_i$ is the width of the ribbon at the centerline's i-th node. Among the advantages of this representation are the natural coupling between the epicardium 301 and the endocardium 302 and the sampling flexibility. The contours can be sampled at any desired precision using fast spline filters as described by M. Unser, A. Aldroubi and M. Eden, "B-spline Signal Processing; Part 1-Theory", *IEEE Transactions on Signal Processing*, Vol. 41, No. 2, pp. 821-832, 1993.

In an embodiment of the invention, the adaptation unit 220 is arranged for detecting the myocardium, estimating the axis of the left ventricle and initializing the template in the image. Optionally, the system 200 may comprise a separate unit to carry out each task, e.g., a detection unit, an axis estimation unit and a template initialization unit. The system 200 is arranged for robustly detecting the myocardium in the short-axis slice images in order to define an initial position for the geometrical template. This is done in three steps: first, the myocardium, which appears as a dark ring, is detected on each slice; second, the left ventricle axis is estimated from these detections and finally, the robust initialization of the model is estimated from both myocardium detection and axis estimation.

To detect the myocardium on short-axis slice images, in an embodiment of the invention the Hough transform is used. The Hough transform is described, for example, in the original paper of P. V. C. Hough, "Method and means for recognizing complex patterns." U.S. Pat. No. 3,069,654, 1962. The Hough transform is tailored for detecting annular shapes. Since the myocardium appears as a dark ring, it can be detected as the best response to the convolution of the image with a radially-symmetric kernel modeling a dark ring. The radial profile of this kernel is given by the Laplacian of a Gaussian shifted by the ring radius and its width is directly related to the expected thickness of the myocardium. The convolution is computed in radial coordinates in the Fourier domain, which corresponds to multiplying the image transform with the analytical Hankel transform of the kernel for each angular frequency. The Hankel transform is described, for example, in Bracewell, R., "The Hankel Transform", *The Fourier Transform and its Applications,* 3rd ed. New York: McGraw-Hill, pp. 244-250, 1999. This operation is one-dimensional and thus very fast. Taking the inverse transform and repeating the process for various ring radii, the best convolution response finally defines the optimal centre and radius for initializing the deformable template.

The axis of the left ventricle is robustly estimated from the centre of the best dark ring detected on each slice image. This is done with the Least Median of Squares method including the outlier rejection step, in order not to take into account possible false myocardium detections. The method is described, for example, in P. J. Rousseeuw, A. M. Leroy, Robust regression and outlier detection, John Wiley & Sons, Inc., New York, N.Y., 1987, Finally, the initial position of the geometrical template is defined for each slice image as follows. If the detected optimal myocardium centre, known from ring detection, is close to the intersection of the left ventricle axis and the current slice and if its radius is similar to a predefined template radius, the template is initialized with the detected optimal centre and radius. Otherwise, the initial centre of the template is the intersection of the axis with the current slice and the radius is calculated from the detected optimal ring, using the parabolic radius model.

In an embodiment of the invention, the criterion function is an energy function describing the energy of the closed ribbon template. The energy function comprises internal energy terms and external energy terms. Internal energy terms attain a minimum when the template geometry is not deformed and identical with a typical template geometry based on a priori knowledge. External energy terms attain a minimum when the template is deformed so that certain parts of the template overlap with certain features detected in the image. The criterion condition is that the energy function attains a minimum.

As part of, in addition to or in combination with the internal and external energy terms, further possible terms of the energy function include, but are not limited to, terms relating to:

Circularity: The centerline 31 should not deviate too much from a circle. A possible choice is to use a measure of the centerline curvature dispersion around its mean, since a circle has a constant curvature.

Regularity: Width variations along the centerline 31 should be limited. This ensures a proper coupling between the contours. A possible choice is again a measure of the dispersion of the width variable around its mean.

Blood pool Homogeneity: Except for papillary muscles, the blood pool should be homogeneous. A possible choice is the variance of the interior region, after having excluded the lowest part of the histogram to account for the possible presence of the papillary muscles.

Myocardium Homogeneity: The myocardium region should be homogenously distributed and dark if the tissue is normal, white otherwise.

Endocardium contrast: The blood pool should locally show higher intensity than the myocardium, which can be measured by the sum of 1-D contrast filters (defined, e.g., on the basis of the first derivative of a Gaussian filter) along the normals to the endocardium contour.

Epicardium contrast: The epicardium should show a positive, negative or ridge-like contrast depending on surrounding organs. This can be measured by the sum of 1-D ridge contrast filters (defined, e.g., on the basis of the second derivative of a Gaussian filter) along the normals to the epicardium.

Myocardium contrast: The average intensity of the myocardium should be less than the average intensity of the blood pool.

In an embodiment, the criterion function is a weighted sum of criterion function terms. The weights are user-specified parameters of the algorithm.

Alternatively or additionally, the criterion function may be a force field acting on the template, and the criterion condition may be that the force field is substantially zero.

The former criterion functions and conditions are defined based on the entire image and are useful with different types of images, for example cine cardiac MR images. However, in case of LEMR SA image data, these conditions are not sufficient to obtain a reliable automatic delineation of myocardial contours, and features defined based on portions of the image are necessary. These features aim at finding a robust solution to the image segmentation task when scars (white areas) are present in the myocardium.

Figure 4:
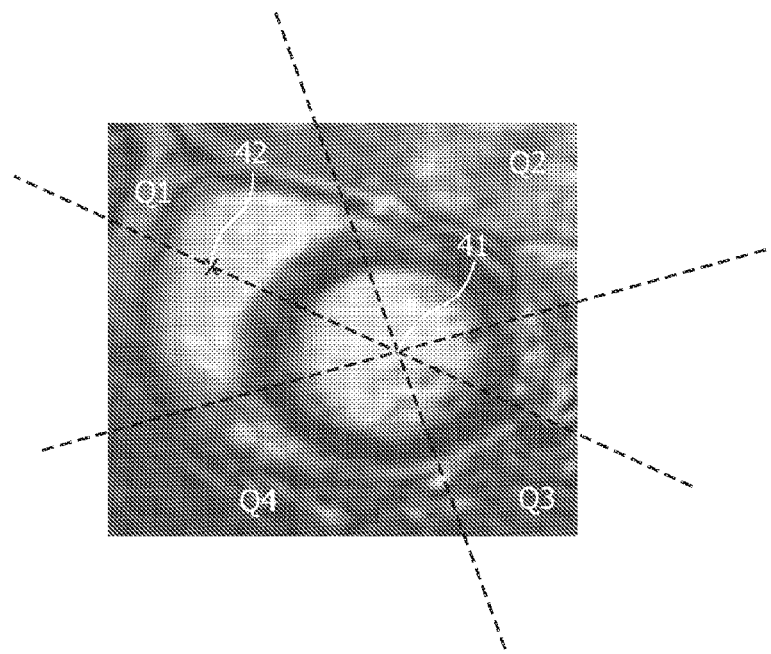
FIG. 4 illustrates an exemplary partition of an image into four quadrants.

In an embodiment of the invention, the image is partitioned into four quadrants Q1, Q2, Q3 and Q4. FIG. 4 illustrates such an exemplary partition of the image. Locations of the four quadrants are determined by the positions of the left ventricle center 41 and right ventricle center 42. In an embodiment of the invention, determining the center of the right ventricle is based on selecting the best correlation between a circular template with the same intensity as the left ventricle blood pool and the image in an annular region located outside the myocardium. The quadrants partition the myocardium and an initialized template into four parts. A term of the criterion function may be defined on the basis of the partition. The contrast terms are adapted to the quadrants on the basis of anatomical knowledge. For example, in Q1, the myocardium is expected to be darker than the surrounding organ (right ventricle) whereas in Q3, the surrounding organ is the lung and is also dark, although a thin slice of fat is often visible. In Q2 and Q4, ridge filters are useful because thin dark and bright tissues alternate outside the myocardium. Thus, instead of computing the criterion terms in the whole myocardium, each term is computed separately in each quadrant. This allows the algorithm to detect abnormal tissue if needed and thus control the adaption process. It is worth pointing out that although the partition of the myocardium defines different portions of the myocardium, these portions are connected to and interact with neighboring portions defined by the partition.

Alternatively, another method of partitioning an image, randomly or based on image analysis, e.g., using object detection or segmentation, may be employed by the partition unit 210 of the system 200. It is worth pointing out that the proposed image partition does not need to lead to a partition of the anatomical structure, e.g., the heart, into recognized substructures, e.g., ventricles and atria. The partition aims at defining more terms of the criterion function, each term having its domain on a portion the structure, to allow more detail and thus, more precision.

In an embodiment of the invention, several tests are carried out in each quadrant in order to detect potential scars or ischemic areas. For example, abnormal tissue is detected if:

the myocardium average intensity inside the quadrant is high compared to the blood pool average intensity.

The cumulative difference of the myocardium gray levels with respect to the expected abnormal tissue value (e.g., 255) is lower than the cumulative intensity difference with respect to the expected healthy myocardium value (e.g., 0).

This test is confirmed if the local gradient inside the myocardium quadrant is low, which means that the region is homogeneous.

In an embodiment of the invention, if a scar is detected in a quadrant, the criterion function terms in the quadrant are adapted in the following way:

as the scar appears in white whereas normal myocardium is dark, the scar is brighter than the surrounding organs; consequently the expected contrast along the borders is changed (e.g., from 0 to 255).

For the same reason, the homogeneity inside the myocardium is defined as the cumulative difference with respect to (or as the dispersion with respect to) the expected abnormal tissue value (e.g., 255) instead of the expected healthy myocardium value (e.g., 0).

Such a test may also be incorporated in a term of the criterion function, for example, as a factor in this term. If the test value is 1 (true) then the term will contribute to the criterion function. If the test value is 0 (false) then the term will not contribute to the criterion function.

In an embodiment of the invention, the criterion function F may be given by the following energy function:

$$F(p,I) = F_s(C,w) + F_c(C_i, C_o, I) + F_r(M,B,I),$$

where:

p is a parameter vector comprising the template parameters, $p_i = ((x_i, y_i, w_i)$ and w is the width vector comprising the widths $w_i$, describing the centerline node coordinates;

C, $C_i$ and $C_o$ are, respectively, the centerline, the inner and the outer contour of the closed ribbon template;

I is the image, i.e., a map which assigns intensities to image locations; and

M and B are, respectively, myocardium and blood pool regions defined by the closed ribbon template placement in the image.

The first term $F_s(C, w)$ is the template shape term and is an internal energy term. For example, $$F_s(C, w) = \lambda_0 \int_0^1 |\kappa(s) - \bar{\kappa}|^2 ds + \lambda_1 \int_0^1 |w'(s)|^2 ds,$$

where $\kappa(s)$ is the centerline curvature and $\bar{\kappa}$ is the mean curvature. A person skilled in the art will understand that s is the parameter of the spline representation of the closed ribbon template model. The centerline curvature and width should both have small variations.

The second term $F_c(C_i, C_o, I)$ is the contour term which is arranged to attract the epicardium and endocardium wall to preferred locations of the image gradients. It can be expressed as $$F_c(C_i, C_i, I) = \lambda_2 \int_0^1 \nabla I_{in}(s) ds - \lambda_3 \int_0^1 |\nabla I_{on}(s)| ds,$$

where $\nabla I_{in} = \nabla I(C_i(s)).n(s)$ and $\nabla I_{in} = \nabla I(C_i(s)).n(s)$, $\nabla I$ is the image gradient and n(s) is the outward pointing normal to the centerline. To implement this term, gradient filters that express prior knowledge of the relative intensity of normal and abnormal parts of the myocardium is used, as described in the paragraph on abnormal tissue detection.

The third term $F_r(M,B,I)$ is the region term. The blood pool gray levels should be homogeneously distributed. Also, normal myocardium tissues are dark while abnormal ones are bright, which results in a strong global contrast with the blood pool. Therefore the region term is:

$$F_r(M, B, I) = \frac{\lambda_4}{|M|} \int_M |I(x, y) - \bar{m}| dx dy + \frac{\lambda_5}{|B|} \int_B |I(x, y) - \bar{b}| dx dy + \lambda_6 C_{glob},$$

where region B has an average intensity $\bar{b}$ and area $|B|$, while the intensity expected for the myocardium region M is $\bar{m}$. $C_{glob}$ is the global contrast between both regions.

The abnormal tissue detection will now be described. To this end, the image computed from a slice of the LEMR SA image data is preprocessed before the template deformation: the intensity distribution mixture is estimated with an Expectation-Maximization algorithm, allowing to stretch the intensity range so as to saturate the darkest and the brightest part of the image. These areas correspond to, respectively, the healthy and abnormal tissues, which are consequently expected to appear as homogeneous regions of the minimum intensity $\bar{h}$ and maximum intensity $\bar{a}$ in the new range. Then, for each portion of the myocardium $M_i = M \cap Q_i$, potential scars or ischemic areas are detected if the following three conditions are satisfied:

the myocardium average intensity inside the quadrant is high compared to the blood average intensity:

$\int_{M_i} |I(x,y)| dxdy > \overline{b}$;

the intensity dispersion with respect to $\overline{a}$ is lower than with respect to $\overline{h}$:

$\int_{M_i} |I(x,y) - \overline{a}| dxdy < \int_{M_i} |I(x,y) - \overline{h}| dxdy$;

the sum of the local gradient magnitude inside the myocardium portion $M_i$ is low.

If a scar is detected in $M_i$, the criterion terms are adapted to the scar. Because the scar is brighter than the surrounding organs, the gradient filters defining the expected contrast along the borders are inverted. For the same reason, the expected value $\overline{m}$ inside the myocardium that is used in $F_r$ is $\overline{a}$ instead of $\overline{h}$.

In an embodiment, the criterion function is not a differentiable function of the template parameters $(x_i, y_i, w_i)$, where i is the index of a node on the centerline, in particular because of the non-linear exclusion of the inside region histogram to account for papillary muscles. Usual gradient-descent methods are thus not an appropriate option for the minimization. Furthermore, any gradient-descent scheme has the intrinsic limitation of being very sensitive to local minima. The optimization scheme is based on a greedy algorithm, relying only on direct criterion computations. This choice provides a good compromise between computational complexity and sensitivity to initial conditions. The employed optimization scheme is more robust than a gradient-descent scheme and less complex than dynamic programming, a traditional choice for globally optimizing spline-based models. A greedy optimization strategy can be described by the following iterative algorithm:

Repeat
(A) Visit each node one by one,
   Perform i-th node parameter $(x_i, y_i, w_i)$ value search within predefined ranges,
   Move to the found optimal position which gives the lowest energy,
(B) Resample and move nodes along the centerline (slide) to increase rotation and parameterization invariance.
until a steady state is found.

Figure 5:
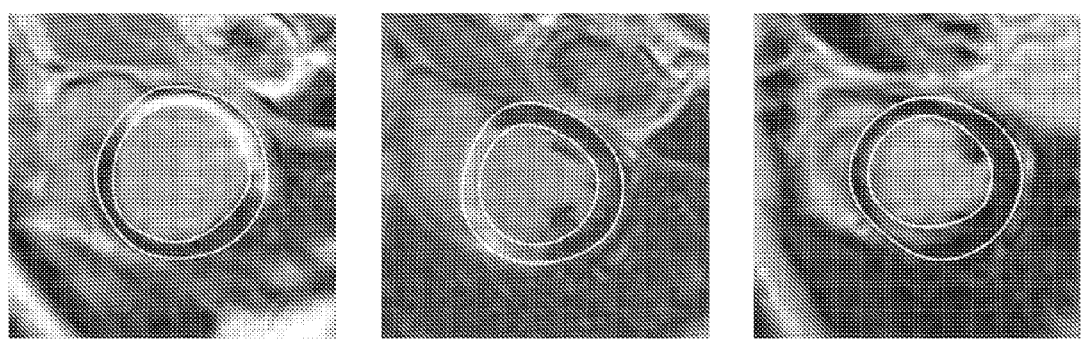
FIG. 5 illustrates results of automatic segmentation of myocardial contours by one embodiment of the system.

FIG. 5 illustrates results of automatic segmentation of myocardial contours by one embodiment of the system 200. The shown exemplary images contain various types of abnormal tissues: large white transmural scars, small sub-endocardial scars, scattered or fuzzy white areas. The white areas are correctly included inside the segmented myocardium. The results are satisfying but some slight inaccuracies remain along the borders on difficult-to-segment images. These inaccuracies generally correspond to abnormal thickness of the myocardium, which is too thin if a scar was excluded from the muscle or too large if the segmentation result included surrounding structures. In order to reduce these inaccuracies and to obtain a 3-D surface model of the myocardium, a further processing of the LEMR SA image data is needed. To address this problem, in an embodiment, the system comprises a registration unit 230 for registering a 3-D surface model with a plurality of templates, wherein each template is adapted to an image computed from a slice of image data by the adaptation unit 220 of the system 200. A suitable surface model may be obtained from delineating epicardial and endocardial surfaces in a cine MR sequence of images.

An LEMR exam is typically done approximately 20 minutes after the acquisition of a cine MR sequence which shows the myocardium movement along the cardiac cycle. During these 20 minutes, the patient does not move on the table. Consequently, all the anatomical information which can be extracted from the cine sequence is useful prior knowledge for segmenting the LEMR volume. In particular, the segmentation of the myocardium is obtained on the whole cine sequence of images, each image corresponding to a phase of the cardiac cycle, by:

segmenting the myocardium in an image corresponding to the end-diastolic phase of the cardiac cycle using, for example, the same approach as in the case of LEMR SA images. No partitioning of the image is needed to segment said end-diastolic MR image;

applying the result of segmentation at the end-diastolic phase to the cine sequence, thereby segmenting each image of the sequence as described, e.g., in Hautvast, G.; Lobregt, S.; Breeuwer, M. & Gerritsen, F. Automatic contour propagation in cine cardiac magnetic resonance images, *IEEE Transactions on Medical Imaging*, 2006, 25, 1472-1482. In the end, for each phase, two 3-D surface models, e.g., polygonal meshes, describing the endocardium and epicardium are obtained. These surface models contain valuable shape and thickness information.

In order to take advantage of this information, the system 200 may be arranged to automatically select the phase which corresponds to the acquired LEMR SA image data, e.g., by reading the DICOM attributes of images, and use the corresponding 3-D surface models as prior information. However, even if the patient does not move between the cine and LEMR exams, she/he may relax or breathe more or less deeply. Consequently, the model surfaces extracted from the cine phase cannot be directly superimposed with the LEMR SA image and a registration step is thus necessary. Alternatively, a suitable surface model obtained in any other way may be used by the system 200 of the invention.

In an embodiment of the system, the system 200 is arranged to further register the surface model with the plurality of templates, wherein each template is adapted to an image computed from a slice of image data by the adaptation unit 220 of the system 200. This is done in two steps:

Rigid or affine transformation attracting the surface models towards the adapted templates. The transformation which leads to the best match between the surface models and the stack of templates is computed and applied to the surface models.

Local refinement of the surface models, depending on the template position and the gray levels of the image. There is greater confidence in the epicardial contour of the template, which is generally more accurate than the endocardial contour of the template. The thickness information provided by the surface models is used to add a coupling constraint to the local deformation. White pixels are searched in the vicinity of the contours, so that the white areas which may have been missed during the template adaptation are recovered. Applying these operations in succession is important, since the affine transformation leads to a robust result whereas the local refinement adjusts the surface models location under the assumption that they are globally well-positioned. Consequently, using only local refinement does not lead to optimal results.

In an embodiment of the invention, the deformation is done using an affine-to-local strategy: first the affine transformation is found which gives the best fit between the mesh and the contours stack, without changing the mesh geometry; then a specific force $F_{3D}$ applied at each mesh vertex is defined. The force $F_{3D}$ takes into account the original shape of the mesh ($F_{int}$), the distance to the appropriate 2D contour ($F_{cont}$) and the myocardium thickness ($F_{th}$):

$$F_{3D}=F_{int}+F_{cont}+F_{th}.$$

Finally, the mesh is locally refined by replacing the contour attracting force by a force testing image intensity ($F_1$) to guarantee that scars, i.e. bright areas, are included inside the final myocardial contours, leading to the following force:

$$F_{3DRefine}=F_{int}+F_I+F_{th}.$$

The result of the segmentation of the myocardium comprises the epicardial and endocardial surface models. In addition, the intersection of the epicardial and endocardial surfaces with each slice of the LEMR SA image data defines improved epicardial and endocardial contours in each image computed from the slice.

Figure 6:
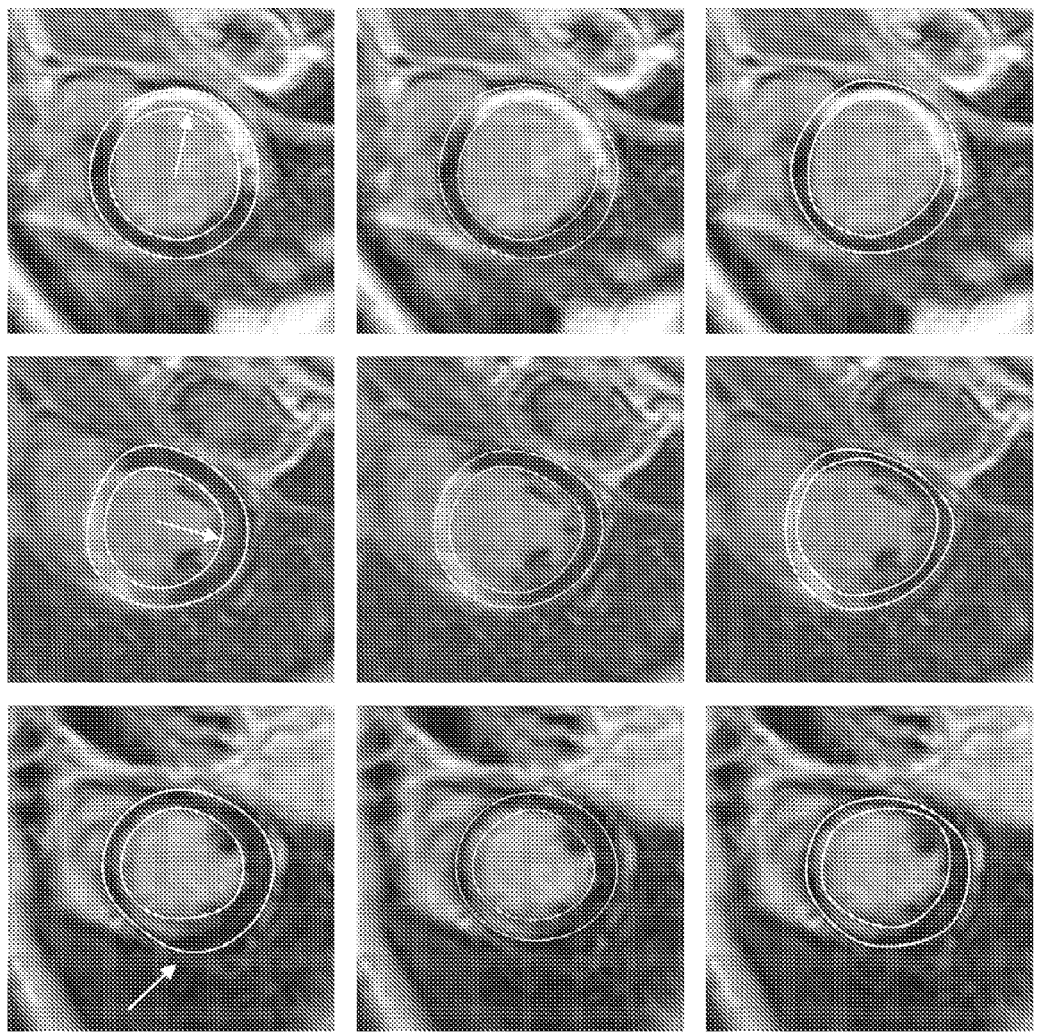
FIG. 6 illustrates results of automatic segmentation of myocardial contours by another embodiment of the system.

The performance of the method has been quantitatively assessed on a database of 27 volumes containing various types of abnormal tissues including, but not limited to, large, white, transmural scars, small sub-endocardial scars, scattered, fuzzy white areas, by comparing the contours obtained with our automatic method with manually drawn contours provided by experts. The average error between the manual and automatic contours is around 1.5 pixels. FIG. 6 illustrates results of automatic segmentation of myocardial contours by an embodiment of the system 200. The first column comprises results of the template adaptation to images computed from slices of image data acquired from different patients. The arrows indicate areas where the adaptation may be still improved. The second row of images illustrates the contours derived from the registered surface models of the myocardial surfaces. The third column shows the result of manual segmentation by experts. The quality of the segmentation is good, for the contours successfully surround both normal and abnormal parts of the myocardium. The results allow to reliably assess the percentage of non-viable tissues, e.g., by delineating the scar tissue in each image and calculating the area of said scar tissue.

A person skilled in the art will appreciate that the system 200 may be a valuable tool for assisting a physician in many aspects of her/his job.

Those skilled in the art will further understand that other embodiments of the system 200 are also possible. It is possible, among other things, to redefine the units of the system and to redistribute their functions. Although the described embodiments apply to medical images, other applications of the system, not related to medical applications, are also possible.

The units of the system 200 may be implemented using a processor. Normally, their functions are performed under the control of a software program product. During execution, the software program product is normally loaded into a memory, like a RAM, and executed from there. The program may be loaded from a background memory, such as a ROM, hard disk, or magnetic and/or optical storage, or may be loaded via a network like the Internet. Optionally, an application-specific integrated circuit may provide the described functionality.

Figure 7:
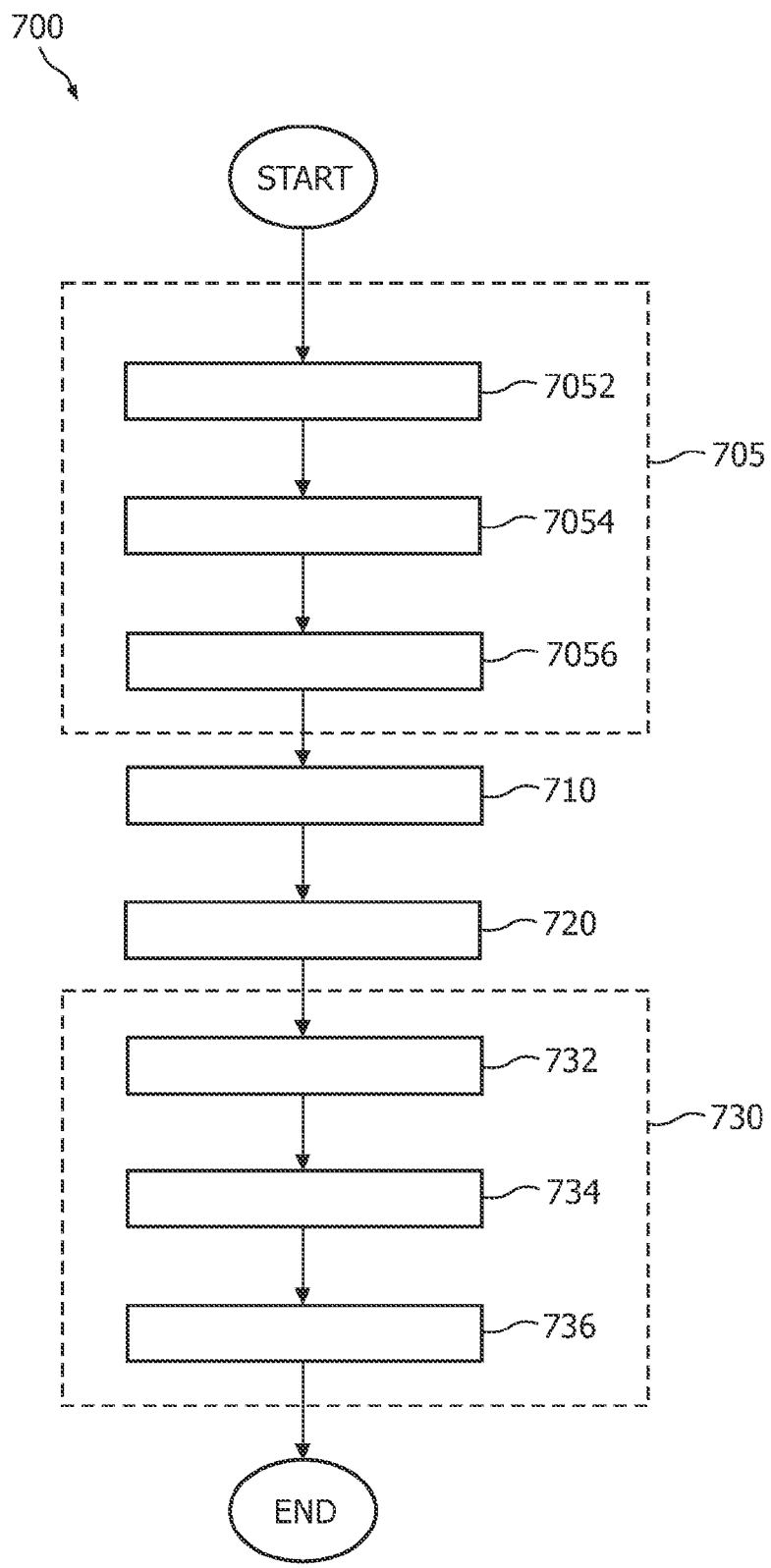
FIG. 7 shows a flowchart of an exemplary implementation of the method.

FIG. 7 shows a flowchart of an exemplary implementation of the method 700 of delineating an anatomical structure in an image computed from a slice of image data. The method 700 begins with a placement step 705 for initializing a template in the image. In an implementation of the method 700, the placement step 705 comprises an axis estimation step 7052 for estimating the axis of the left ventricle, a detection step 7054 for detecting the myocardium, and an initialization step 7056 for determining the initial position of the template in the image. After the placement step 705, the method 700 continues to a partition step 710 for partitioning the image into a plurality of image portions, e.g., quadrants, each image portion depicting a portion of the anatomical structure. After the partition step 710, the method 700 continues to an adaptation step 720 for adapting a template to the image, based on a criterion function, the criterion function being a function of template parameters and of image values and their relative positions in the image, and on a criterion to be satisfied by a computed value of the criterion function, wherein the criterion function is defined on the basis of the plurality of image portions. After the adaptation step 730, the method 700 continues to a registration step 730 for registering a surface model with a plurality of templates, wherein each template is adapted to an image computed from a slice of image data in the adaptation step 720 of the method 700. In an implementation of the method 700, the registration step comprises an affine transformation step 732 for affinely registering the surface model with the plurality of templates, thereby creating an affinely registered surface model, followed by a local deformation step 234 for locally non-affinely registering the affinely registered surface model with the plurality of templates, thereby creating a locally registered surface model, followed by a refinement step 736 for adapting the locally registered surface model to the image data. After the registration step 730, the method 700 ends.

A person skilled in the art may change the order of some steps or perform some steps concurrently, using threading models, multi-processor systems or multiple processes, without departing from the concept as intended by the present invention. Optionally, two or more steps of the method of the current invention may be combined into one step. Optionally, a step of the method of the current invention may be split into a plurality of steps.

Figure 8:
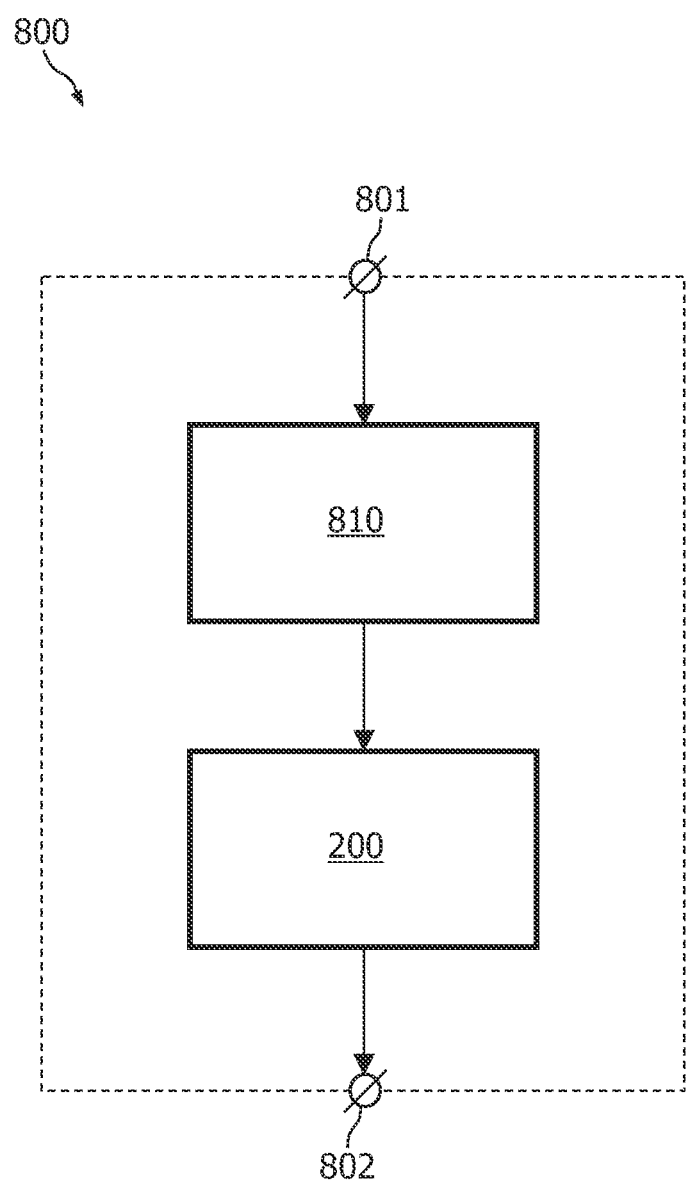
FIG. 8 schematically shows an exemplary embodiment of the image acquisition apparatus.

FIG. 8 schematically shows an exemplary embodiment of the image acquisition apparatus 800 employing the system 200, said image acquisition apparatus 800 comprising a CT image acquisition unit 810 connected via an internal connection with the system 200, an input connector 801, and an output connector 802. This arrangement advantageously increases the capabilities of the image acquisition apparatus 800, providing said image acquisition apparatus 800 with advantageous capabilities of the system 200.

Figure 9:
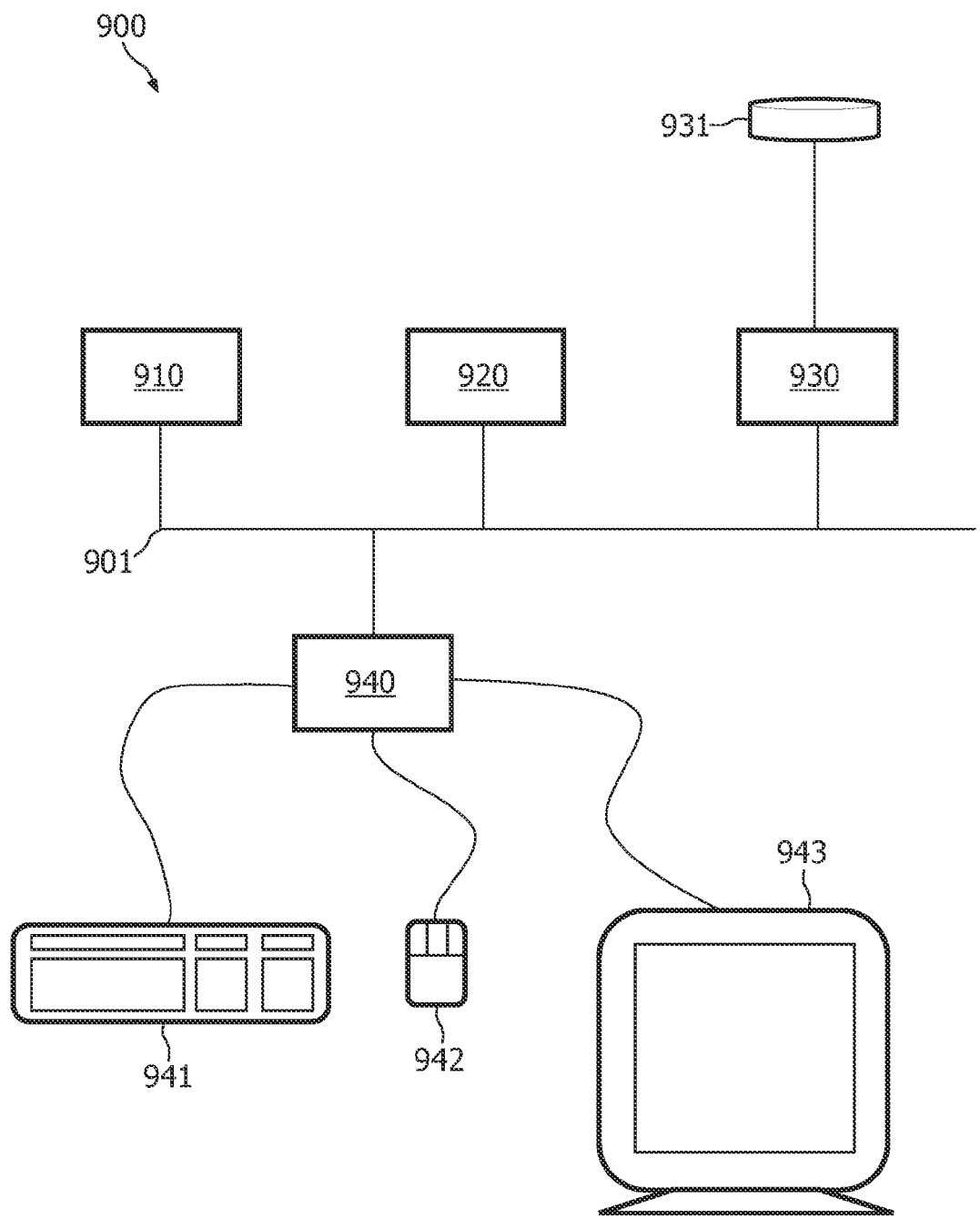
FIG. 9 schematically shows an exemplary embodiment of the workstation.

FIG. 9 schematically shows an exemplary embodiment of the workstation 900. The workstation comprises a system bus 901. A processor 910, a memory 920, a disk input/output (I/O) adapter 930, and a user interface (UI) 940 are operatively connected to the system bus 901. A disk storage device 931 is operatively coupled to the disk I/O adapter 930. A keyboard 941, a mouse 942, and a display 943 are operatively coupled to the UI 940. The system 200 of the invention, implemented as a computer program, is stored in the disk storage device 931. The workstation 900 is arranged to load the program and input data into memory 920 and execute the program on the processor 910. The user can input information to the workstation 900, using the keyboard 941 and/or the mouse 942. The workstation is arranged to output information to the display device 943 and/or to the disk 931. A person skilled in the art will understand that there are numerous other embodiments of the workstation 900 known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and by means of a programmed computer. In the system claims enumerating several units, several of these units can be embodied by one and the same item of hardware or software. The usage of the words first, second, third, etc., does not indicate any ordering. These words are to be interpreted as names.

The invention claimed is:

1. A system (200) for delineating an anatomical structure in an image computed from a slice of image data, the system (200) comprising:
   a computer processor executing a partition unit (210) configured to partition the image into a plurality of image portions, each image portion depicting a portion of the anatomical structure; and
   a computer processor executing an adaptation unit (220) configured to adapt a template to the image, based on a criterion function, the criterion function being a function of template parameters and of image values and their relative positions in the image, and on a criterion to be satisfied by a computed value of the criterion function,
   wherein the criterion function is defined on the basis of the plurality of image portions.

2. A system (200) as claimed in claim 1, wherein the adaptation unit (220) is further arranged to detect an abnormal tissue of the anatomical structure in an image portion of the plurality of image portions and the criterion function comprises a term contributing to the criterion function when said abnormal tissue is detected in said image portion.

3. A system (200) as claimed in claim 1, wherein adapting the template is based on searching for values of the template parameters, for which the criterion function satisfies the criterion condition, using a greedy search algorithm.

4. A system (200) as claimed in claim 1, wherein the template is a closed ribbon defined by an external and an internal closed contour.

5. A system as claimed in claim 1, wherein the partition is a pie-like partition.

6. A system (200) as claimed in claim 1, further comprising a computer processor executing a registration unit (230) configured to register a surface model with a plurality of templates, wherein each template is adapted to an image computed from a slice of image data and wherein at least one template is adapted by the adaptation unit (220) of the system (200).

7. A system (200) as claimed in claim 6, wherein the registration unit (230) comprises: a computer processor executing an affine transformation unit (232) configured to affinely register the surface model with the plurality of templates, thereby creating an affinely registered surface model; a computer processor executing a local deformation unit (234) configured to locally non-affinely register the affinely registered surface model with the plurality of templates, thereby creating a locally registered surface model; and a computer processor executing a refinement unit (236) configured to adapt the locally registered surface model to the image data.

8. A method (700) of delineating an anatomical structure in an image computed from a slice of image data, the method (700) comprising:
   a computer processor executing a partition step (710) configured to partition the image into a plurality of image portions, each image portion depicting a portion of the anatomical structure; and
   a computer processor executing an adaptation step (720) configured to adapt a template to the image, based on a criterion function, the criterion function being a function of template parameters and of image values and their relative positions in the image, and on a criterion to be satisfied by a computed value of the criterion function,
   wherein the criterion function is defined on the basis of the plurality of image portions.

9. An image acquisition apparatus (800) comprising a system (200) as claimed in claim 1.

10. A workstation (900) comprising a system (200) as claimed in claim 1.

11. A computer program product to be loaded by a computer arrangement, comprising instructions stored on a non-transitory computer readable storage medium, the instructions delineating an anatomical structure in an image computed from a slice of image data, the computer arrangement comprising a processing unit and a memory, the computer program product, after being loaded, providing said processing unit with the capability to carry out the tasks of:
   partitioning the image into a plurality of image portions, each image portion depicting a portion of the anatomical structure; and
   adapting a template to the image, based on a criterion function, the criterion function being a function of template parameters and of image values and their relative positions in the image, and on a criterion to be satisfied by a computed value of the criterion function,
   wherein the criterion function is defined on the basis of the plurality of image portions.

* * * * *